3,419,636
BLENDS OF ALIPHATIC POLYAMIDES AND CYCLIC COPOLYAMIDES

Edward W. Pietrusza and Walter J. Zybert, Morristown, and Jack R. Pedersen, Parsippany, N.J., assignors to Allied Chemical Corporation, New York, N.Y., a corporation of New York
No Drawing. Filed Feb. 3, 1966, Ser. No. 524,849
9 Claims. (Cl. 260—857)

ABSTRACT OF THE DISCLOSURE

Blends of nylon 6 or nylon 66 with from 10 to 60% by weight of a processable copolymer prepared by copolymerizing a mixture of at least 35 mol percent of a meta-substituted cyclic amino acid and at least 18 mol percent of a para-substituted cyclic amino acid or their N-acyl derivatives. These blends are more resistant to plastic flow under stress than unmodified nylons and thus are useful in the preparation of tire cord.

---

This invention relates to blends of polyamides. More particularly, this invention relates to blends of nylon with certain polyamide copolymers and the improved yarns which can be produced therefrom.

Yarns obtained from the melt-spinning of polyamides such as those prepared by condensation of hexamethylene diamine and adipic acid, known as nylon 66, or by polymerization of epsilon-caprolactam, known as nylon 6, are widely used in yarn form or in cord form as the fibrous reinforcement in elastomeric tires and other industrial articles such as conveyor belts, seat belts, hoses, and the like, wherein high strength is required. Nylon yarns manufactured as tire yarns have high tenacity and show very high fatigue resistance as measured by standard tests.

One problem, however, in the use of nylon yarns as the reinforcing agent in elastomeric tires is that tires so constructed have a tendency to form "flat spots." The flat-spot phenomenon occurs when tires having nylon fibrous reinforcement, after having been heated during travel, stand motionless supporting the weight of a vehicle for a few hours. During such a period of standing, the flattened portion of the tire which is in contact with the ground develops a slight set or flat spot that is removed only after the tire has been reheated through travel. Accordingly, when a car equipped with such tires is driven after standing, an undesirable first impression of bumpy riding characteristics is created. This flat-spotting is one manifestation of the property of plastic flow under stress, or "creep" as it is commonly called.

It is, therefore, an object of the present invention to provide a nylon composition suitable for the preparation of improved nylon filaments.

Another object of this invention is to provide nylon tire cord that does not distort and form flat spots when used as a reinforcing agent in tires.

Additional objects and advantages of this invention will become apparent from the following detailed description thereof.

In accordance with the present invention, nylon 6 or nylon 66 is blended with a polyamide copolymer composed of a first monomer having the formula:

(I)    R—NH—(CH$_2$)$_m$—R$_1$—(CH$_2$)$_n$—COOH where R is a member selected from the group consisting of hydrogen and acyl groups, R$_1$ is a divalent radical selected from the group consisting of

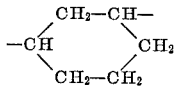

and

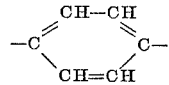

and $m$ and $n$ are integers of 0 to 3; and a second monomer having the formula:

(II)    R—NH—(CH$_2$)$_m$—R$_2$—(CH$_2$)$_n$—COOH where R, $m$ and $n$ have the meanings given above and R$_2$ is a divalent radical selected from the group consisting of

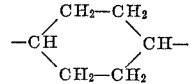

and

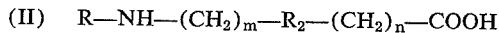

These copolymers have copolymerized therein at least 35 mol percent of said first monomer and at least 18 mol percent of said second monomer. The blends contain from 10 to 60% by weight of the copolymer and from 40 to 90% by weight of nylon. Preferably at least 60% by weight of the blend is nylon. The blends are most conveniently prepared in the melt but solution blending using a solvent such as sulfuric acid can also be employed.

The copolymers useful in practicing this invention can be prepared by heating a mixture of a first monomer of above-given Formula I and a second monomer of above-given Formula II at a temperature between 200° C. and the decomposition temperature of the copolymer. Preferably the copolymerization is carried out at a temperature between the melting point of the copolymer and 300° C.

When R in all of the monomers employed is hydrogen, a condensation-type reaction occurs, whereby water is split off and a copolymer is formed containing the units:

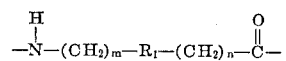

and

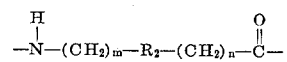

where R$_1$ and R$_2$ and $m$ and $n$ have the meanings given above.

The polymer chains thus produced are terminated at one end by an amino group and at the other end by a carboxyl group. The amino end groups interact to some extent with the nylon upon melt-blending, and it is preferable to replace all or part of the monomers with their N-acylated derivatives, i.e. R is an acyl group in Formulas I and II. In this manner, chains are obtained which are terminated at one end with an acyl group instead of an amino group. The preferred N-acyl derivatives are represented by the formulas:

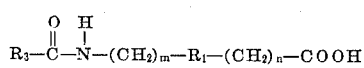

and

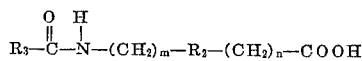

where R$_1$, R$_2$, $m$ and $n$ have the meanings given above and R$_3$ is hydrogen or an alkyl group of 1 to 5 carbon atoms.

Upon heating the N-acylated compounds, the above-described polymeric units are formed by the splitting off of an acid as illustrated by the following equation in which the acylated compound is N-acetyl benzylamine-3-carboxylic acid:

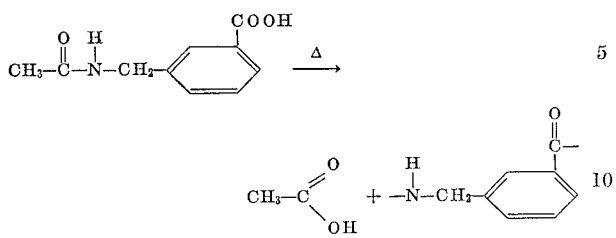

To facilitate the removal of the acid from the reaction mixture, it is advantageous to have a reduced pressure in the system, at least during the latter steps of the polymerization.

Illustrative of the monomers of Formula I which can be used to prepare the polyamide copolymers are m-aminobenzoic acid, benzylamine-3-carboxylic acid, m-aminoethylbenzoic acid, m-aminopropylbenzoic acid, m-aminophenylacetic acid, m-aminophenylpropionic acid, m-aminophenylbutyric acid, benzylamine-3-acetic acid, benzylamine-3-propionic acid, m-aminopropylphenylcyclohexane-carboxylic acid, 3-aminomethylcyclohexaneacetic acid, and the N-formyl, N-acetyl and N-propionyl derivatives thereof.

Illustrative of the monomers of Formula II which can be used to prepare the polyamide copolymers are p-aminobenzoic acid, benzylamine-4-carboxylic acid, p-aminoethylbenzoic acid, p-aminopropylbenzoic acid, p-aminophenylacetic acid, p-aminophenylpropionic acid, p-aminophenylbutyric acid, benzylamine-4-acetic acid, benzylamine-4-propionic acid, m-aminopropylphenylpropionic acid, 4-aminocyclohexanecarboxylic acid, 4-aminomethylcyclohexanecarboxylic acid, 4-aminomethylcyclohexaneacetic acid, and the N-formyl, N-acetyl and N-propionyl derivatives thereof.

The carboxyl end groups of the copolymers can be replaced by less reactive end groups to prevent any possible interaction. One means of accomplishing this is to add to the copolymer reaction mixture an amino compound such as compounds of the Formula $R_4NH_2$, where $R_4$ is a monovalent hydrocarbon group free of aliphatic unsaturation. Such compounds can be added in amounts up to about 10 mol percent of the polymeric reaction mixture. Illustrative of suitable amino compounds are benzylamine, α-phenylethylamine, ethylamine, isopropylamine, n-heptylamine, aniline, p-toluidine, and cyclohexylamine.

Another method of reducing the number of carboxyl terminal groups present in the copolymer is to react the copolymer with a diamine of the formula $NH_2R_5NH_2$, where $R_5$ is a divalent hydrocarbon group free of aliphatic unsaturation. Illustrative of such diamines are m-xylylene diamine, p-xylylene diamine, ethylenediamine, 1,5-pentanediamine, p-phenylenediamine, and 1,4-diaminocyclohexane. The amino groups react with the carboxyl groups of two polymer chains linking them together to form a higher molecular weight polymer. The diamine can be employed in an amount up to about 10 mol percent of the copolymer. The reaction can be carried out at a temperature ranging from the melting point of the copolymer to the copolymer decompoistion temperature; preferably the maximum reaction temperature is about 300° C.

The blends of the present invention can be prepared by heating a mixture of one of the above-defined copolymers with nylon 6 or nylon 66 at a temperature ranging from above the melting point of the highest melting component to about 350° C., with a maximum temperature of about 320° C. being preferred. The nylon and the copolymer can be dry-blended before melting or the entire process can be carried out in the melt. The melt-blending can be conveniently accomplished by stirring or extrusion. Since it is desirable to have a low moisture content in the melt-blend, the blending process is preferably conducted in a dry, inert atmosphere.

The blends can also be prepared by dissolving the nylon and the copolymer in a common solvent and then precipitating a mixture of these polymers. In a typical procedure the nylon and the copolymer are dissolved in concentrated sulfuric acid and then a blend is precipitated by pouring the solution into ice water. The blend is washed to remove acid and then dried.

The blends of the present invention contain 40 to 90% by weight nylon 6 or nylon 66 and from 10 to 60% by weight of the polyamide copolymer. Preferably the blends contain at least 60% by weight of nylon 6 or nylon 66. The blends can be formed into yarn by the well-known techniques employed with nylon.

Tire yarn produced from these blends possess the valuable properties of conventional nylon yarns with a greatly reduced propensity to produce flat-spotting. The flat-spotting of a given tire cord is related to the set developed by the cord when subjected to a cycle of temperature and stress. A test for determining flat-spotting propensity which correlates well with the actual performance of the yarn is as follows.

Apparatus

The fiber to be tested is hung inside a 12 inch long tube provided with electric heating means. The lower end of the fiber is attached to a hook on which weights can be hung. The bottom of the hook has a pointer which moves opposite a scale graduated in hundredths of an inch thus enabling changes in length of the fiber to be accurately determined. The tube is constantly flushed by a stream of dry nitrogen.

Testing

After conditioning, the following steps are carried out measuring the sample length at every step:

(1) Without removing the load, the fiber is cooled to room temperature.
(2) The fiber is heated to 100° C.
(3) Steps 1 and 2 are repeated until a constant fiber length is obtained.
(4) With the fiber at 100° C., the ½ gram per denier load is removed.
(5) The fiber is cooled to room temperature.
(6) The ½ gram per denier load is replaced.

The difference in readings measured in Steps 6 and 1, expressed in percent length, is the flatspot index, hereinafter abbreviated "FSI." Using the same sample, the test is repeated until three FSI readings within 0.1% are obtained consecutively. The average of these three readings is taken as the FSI.

The flatspot indexes of both nylon 6 and nylon 66 are generally in excess of 1.5, and as hereinabove discussed, tires produced therefrom exhibit considerable flatspotting. By blending these nylons with copolymers in accordance with this invention, the FSI is substantially reduced. Particularly outstanding results have been obtained with copolymers based on benzylamine-3-carboxylic acid and benzylamine-4-carboxylic acid, especially when terminated in the above-defined manner. These copolymers and their preparation are described in detail in copending U.S. patent application Ser. No. 487,900 of Pietrusza et al., filed Sept. 16, 1965. Blends containing such copolymers are described in Example 1 of this application with FSI values as low as 0.2 being obtained. This FSI is the same as that of rayon tire yarn which gives no objectionable flatspotting.

Another copolymer system which gives excellent results in the blends of this invention are copolymers based on benzylamine-3-carboxylic acid and aminomethylcyclohexane-4-carboxylic acid. Yarns having an FSI of 0.4 have been prepared from such blends and are described in Example 2.

The melt blends have considerably higher glass transition temperatures than either nylon 6 or nylon 66, and this factor is believed to contribute to the reduced propensity to flatspotting exhibited by yarns prepared from the blends.

The glass transition temperature of a polymer, abbreviated $T_g$, may be defined as the temperature at which the polymer changes from a glassy or brittle condition to a rubbery plastic or liquid condition. It is at temperatures in the vicinity of this glass transition temperature that the sharpest transition from the glass-like to the plastic or viscous mechanism of deformation appears. Thus, in the vicinity of this $T_g$, there is a distinct change in the slope of curves of temperature versus tensile properties and other temperature dependent physical properties. Below the region of $T_g$, physical properties of polymers in general are only slightly dependent upon temperature; whereas, when temperatures rise into the $T_g$ region, a sharp decrease is observed in tensile and bending moduli, and tenacity; and a sharp increase is observed in elongation, shrinkage, creep, etc. In short, at and above its $T_g$, the polymer exhibits much greater deformation under given stress than at lower temperatures.

The $T_g$ can be measured by various methods which give identical or only slightly different results. The $T_g$'s in the present work were determined from a plot of apparent modulus of rigidity, measured in accordance with ASTM Test D 1053, versus temperature. The apparent modulus of rigidity drops sharply at the $T_g$, and for the purposes of our determinations, a point in the vertical portion of the curves corresponding to 14,500 p.s.i. was said to represent the modulus of rigidity at the $T_g$.

The following examples are given to further illustrate the invention, but it is to be understood that the invention is not to be limited in any way by the details described therein. In the examples, the tensile property measurements reported were carried out on 10-inch specimen samples using an Instron tensile tester operated at a constant speed cross-head separation of 6″ per minute at normal ambient temperature (about 20° C.). The parts given are by weight, and the reduced viscosities reported were measured in 0.5% solution in meta-cresol at 25° C.

EXAMPLE 1

A series of filaments were prepared from melt blends in which the nylon was either nylon 6 having a reduced viscosity of 3.30 or nylon 66 having a reduced viscosity of 1.70 and the polyamide copolymer was a copolymer of benzylamine-3-carboxylic acid or an N-acyl derivative thereof, with benzylamine-4-carboxylic acid or an N-acyl derivative thereof. The general procedure used in preparing the filaments is as follows. Particles of nylon and the copolymer were placed in a flask equipped with mechanical stirrer, gas inlet and outlet tubes, and a vacuum connection. A nitrogen atmosphere of 0.2 mm. Hg pressure was established in the flask and the flask was heated to 290°–300° C. The resulting melt was stirred for 20 minutes, following which the blended product was cooled to room temperature. The melt blend was reduced to particles which were extruded at 270° C. to give monofils having a diameter of 20 mils. These filaments were then mechanically drawn in a ratio of 5.4:1 at a temperature of 180° C. The blend compositions employed in each run were as follows.

Run 1

85 parts of benzylamine-3-carboxylic acid and 15 parts of benzylamine-4-carboxylic acid were mixed and charged to a reaction vessel equipped with stirring means and inlet and outlet tubes for gases. A nitrogen atmosphere was maintained throughout. The vessel was placed in an oil bath equipped with temperature control means at an initial temperature of 120° C. The temperature was increased to 280° C. over a period of 3 hours and was held for an additional 1½ hours. The vessel was then allowed to cool to room temperature.

The experiment was repeated using approximately the same temperature cycle but different proportions of the starting materials. The results are summarized in Table I.

TABLE I

| Weight, percent | | Melting point, ° C. |
|---|---|---|
| Benzylamine-3-carboxylic acid | Benzylamine-4-carboxylic acid | |
| 100 | 0 | 346 |
| 85 | 15 | 319 |
| 80 | 20 | 236 |
| 75 | 25 | 233 |
| 70 | 30 | 236 |
| 65 | 35 | 231 |
| 55 | 45 | 241 |
| 45 | 55 | 247 |
| 40 | 60 | 270 |
| 0 | 100 | 370 |

50 parts of the copolymer prepared as above was melt blended with 50 parts of nylon 6.

Run 2

50 parts of benzylamine-3-carboxylic acid, 50 parts of benzylamine-4-carboxylic acid and 10 parts of N-acetyl benzylamine-4-carboxylic acid were admixed in a reaction vessel such as that described in Run 1. The reaction mixture was heated to 295° C. and maintained at this temperature for 6¾ hours. After 1½ hours the pressure in the system was reduced from atmospheric to 1 mm. of mercury. During the reaction, water and acetic acid were distilled from the reaction vessel.

20 parts of the copolymer prepared above was melt blended with 80 parts of nylon 6.

Run 3

70 parts of N-formyl benzylamine-3-carboxylic acid and 30 parts of N-formyl benzylamine-4-carboxylic acid were mixed together and charged to a reaction vessel similar to that described in Run 1. The vessel was then placed in an oil bath at 170° C. The monomers melted with the evolution of gas and the temperature was increased to 265° C. After 1 hour the pressure was reduced to 0.1 mm. of Hg and the temperature was maintained at 275–285° C. for 4 hours. The resultant copolymer had a melting point of 220–235° C.

30 parts of the copolymer prepared above was melt blended with 70 parts of nylon 6.

Run 4

30 parts of N-acetyl benzylamine-4-carboxylic acid, 70 parts of N-acetyl benzylamine-3-carboxylic acid and 2 parts of benzylamine were admixed in a reaction vessel such as that described in Run 1. The reaction mixture was heated to 260° C. and the resulting acetic acid distillate was collected. After 2 hours the pressure was reduced to 1 mm. of Hg and the reaction was continued for 20 hours at this pressure. The resultant copolymer had a melting point of 215–220° C.

30 parts of the copolymer prepared above was melt blended with 70 parts of nylon 6.

Run 5

15 parts of the copolymer prepared in Run 4 was melt blended with 85 parts of nylon 6.

Run 6

20 parts of the copolymer prepared in Run 4 was melt blended with 80 parts of nylon 66.

Run 7

5 parts of the copolymer prepared in Run 4 was melt blended with 95 parts of nylon 6.

*Controls*

Run 8

Nylon 6.

Run 9

Nylon 66.

In the following run the components were mixed by extrusion rather than stirring. The materials were extruded and the filaments were chopped up and then re-extruded.

Run 10

70 parts of N-acetyl benzylamine-3-carboxylic acid and 30 parts of N-acetyl benzylamine-4-carboxylic acid were mixed and charged to a reaction vessel as in Run 1. The reaction vessel was heated to 260° C. and maintained at this temperature for about 4 hours. The vessel was then evacuated to a pressure of about 0.1 mm. of Hg and heated at 260–270° C. for about 80 hours. During the reaction, acetic acid was distilled from the reactants.

30 parts of the copolymer prepared above was melt blended with 70 parts of nylon 6.

Reduced viscosities of the blends and the physical properties of the filaments are summarized in Table II.

TABLE II

| Run No. | $\eta$ sp./C. | Tg, °C. | Ultimate elongation, percent | Ultimate tensile strength, g./den. | Tensile modulus, g./den. | Flat spot index |
|---|---|---|---|---|---|---|
| 1 | 1.14 | | 13.3 | 2.0 | 54.5 | 0.90 |
| 2 | 1.60 | | 9.9 | 6.8 | 97.5 | 0.65 |
| 3 | 1.50 | | 16.2 | 4.9 | 96.6 | 0.30 |
| 4 | 1.80 | | 12.6 | 5.3 | 91.1 | 0.25 |
| 5 | 3.00 | | 12.7 | 7.6 | 101.0 | 0.75 |
| 6 | 1.40 | | 10.8 | 7.4 | 83.3 | 0.30 |
| 7 | 2.90 | | 13.2 | 6.6 | 75.0 | 2.60 |
| 8 | 3.30 | 38 | 14.9 | 7.3 | 70.0 | 2.20 |
| 9 | 1.70 | 40 | 14.1 | 8.4 | 70.7 | 1.55 |
| 10 | 1.40 | 77 | 13.2 | 5.2 | 87.0 | 0.20 |

Filaments possessing a low FSI can also be made by substituting for the copolymers of Runs 1–6 an equal amount by weight of the copolymer of Example 6 of copending application Ser. No. 487,900. This copolymer was prepared by heating 191 parts of N-acetyl benzylamine-3-carboxylic acid with 82 parts of N-acetyl benzylamine-4-carboxylic acid at 270° C. for 6 hours; the pressure in the system was reduced to 0.1 mm. Hg after the first two hours. 50 parts of the resulting polymer was admixed with 1.4 parts of m-xylylene diamine.

EXAMPLE 2

Equimolar portions of aminomethylcyclohexane-4-carboxylic acid and N-acetyl benzylamine-3-carboxylic acid were admixed and placed in a round-bottom flask fitted with mechanical stirrer, inlet and outlet tubes for gases, a distillation head, and a vacuum line. The flask was heated at 240° C. in a nitrogen atmosphere for 1½ hours, during which time water and acetic acid were distilled from the reaction mixture. The pressure was then reduced to 0.22 mm. Hg and the flask was heated at 265° C. for 18 hours. A hard glass-like polymer was obtained: $T_g=175°$ C.; melting point=235° C.; and $\eta$ sp./C.=0.46.

A number of filaments were prepared from blends of the above copolymer and nylon using the same blending and filament-forming procedures as employed for Runs 1–7 of Example 1. The results are summarized in Table III.

atmosphere for one hour during which time acetic acid and water were distilled from the reaction mixture. The pressure was then reduced to 0.2 mm. Hg and the flask maintained at 245° C. for 18 hours. A copolymer was obtained having a reduced viscosity of 0.35.

Three parts of the copolymer were blended with nylon 6 ($\eta$ sp./C.=3.30) and a filament prepared using the blending and extrusion procedures of Example 2. The blend had a reduced viscosity of 1.60, and the properties of the filament were as follows. Ultimate elongation=14.5%; ultimate tensile strength=5.9 g./den.; tensile modulus=93.3 g./den.; and flatspot index=0.50.

It will be apparent that many modifications and variations may be effected without departing from the scope of the novel concepts of the present invention, and the illustrative details disclosed are not to be construed as imposing undue limitations on the invention.

We claim:
1. A melt processable blend comprising (a) 40 to 90% by weight of a first polyamide selected from the group consisting of poly-ε-caproamide and polyhexamethylene adipamide and from about 10 to 60% by weight of a polyamide copolymer of a first monomer having the formula R—NH($CH_2$)$_m$—$R_1$—($CH_2$)$_n$—COOH, where R is a member selected from the group consisting of hydrogen and acyl groups, $R_1$ is a divalent radical selected from the group consisting of

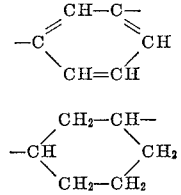

and

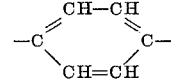

and $m$ and $n$ are integers of 0 to 3; and a second monomer having the formula

R—NH—($CH_2$)$_m$—$R_2$—($CH_2$)$_n$—COOH where R, $m$ and $n$ have the meanings given above, and $R_2$ is a divalent radical selected from the group consisting of

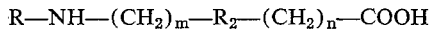

TABLE III

| Blends | $\eta$sp./C. | Ultimate elongation, percent | Ultimate tensile strength, g./den. | Tensile modulus, g./den. | Flat spot index |
|---|---|---|---|---|---|
| 30% copolymer, 70% nylon 6 [1] | 1.70 | 10.1 | 5.3 | 92.8 | 0.40 |
| 15% copolymer, 85% nylon 6 [1] | 2.50 | 12.9 | 8.0 | 78.5 | 1.10 |
| 5% copolymer, 95% nylon 6 [1] | 3.30 | 17.0 | 5.0 | 61.0 | 1.90 |
| 30% copolymer, 70% nylon 6 [2] | 1.40 | 14.4 | 6.9 | 93.1 | 0.50 |
| Controls: | | | | | |
| [1] Nylon 6 | 3.30 | 14.9 | 7.30 | 70.0 | 2.20 |
| [2] Nylon 6 | 1.80 | 25.5 | 4.65 | 76.3 | 2.60 |

EXAMPLE 3

Seven parts of N-acetyl benzylamine-3-carboxylic acid and 3 parts of benzylamine-4-acetic acid were admixed and placed in a reaction flask such as described in Example 2. The flask was heated at 250° C. in a nitrogen and

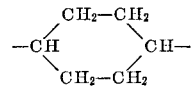

said copolymer containing at least 35 mol percent of said first monomer and at least 18 mol percent of said second monomer.

2. A filament prepared from the blend of claim 1.

3. A blend as claimed in claim 1 containing at least 60% by weight of said first polyamide.

4. A Blend as claimed in claim 1 wherein said polyamide copolymer contains terminal end groups derived from amino compounds of the formula $R_3NH_2$, where $R_3$ is a monovalent hydrocarbon radical free of aliphatic unsaturation.

5. A blend as claimed in claim 1 wherein said polyamide copolymer additionally contains copolymerized therein a compound of the formula $NH_2R_4NH_2$, where $R_4$ is a divalent hydrocarbon radical free of aliphatic unsaturation.

6. A blend as claimed in claim 1 wherein said first monomer of the polyamide copolymer is benzylamine-3-carboxylic acid or an N-acyl derivative thereof and said second monomer of the polyamide copolymer is benzylamine-4-carboxylic acid or an N-acyl derivative thereof.

7. A blend as claimed in claim 1 wherein said first monomer of the polyamide copolymer is benzylamine-3-carboxylic acid or an N-acyl derivative thereof and said second monomer of the polyamide copolymer is aminomethylcyclohexane-4-carboxylic acid.

8. A process comprising melt blending (a) 40 to 90 parts by weight of a polymer selected from the group consisting of poly-ε-caproamide and polyhexamethylene adipamide with from about 10 to 60 percent by weight of a polyamide copolymer of a first monomer having the formula $R-NH-(CH_2)_m-R_1-(CH_2)_n-COOH$, where R is a member selected from the group consisting of hydrogen and acyl groups, $R_1$ is a divalent radical selected from the group consisting of

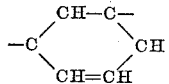

and

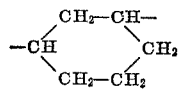

and $m$ and $n$ are integers of 0 to 3; and a second monomer having the formula $$R-NH-(CH_2)_m-R_2-(CH_2)_n-COOH$$

where R, $m$ and $n$ have the meanings given above, and $R_2$ is a divalent radical selected from the group consisting of

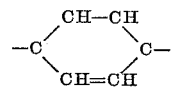

and

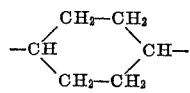

said copolymer containing at least 35 mol percent of said first monomer and at least 18 mol percent of said second monomer at a temperature ranging from above the melting point of the highest melting component to about 350° C.

9. A process as claimed in claim 8 wherein said polyamide copolymer contains terminal end groups derived from amino compounds of the formula $R_3NH_2$, where $R_3$ is a monovalent hydrocarbon radical free of aliphatic unsaturation.

References Cited

UNITED STATES PATENTS 3,296,213  1/1967  Preston _____ 260—857
3,216,965  11/1965  Cipriani _____ 260—857

MURRAY TILLMAN, *Primary Examiner.*

P. LIEBERMAN, *Assistant Examiner.*

U.S. Cl. X.R.

260—78; 152—359